(12) United States Patent
Maeda et al.

(10) Patent No.: US 8,479,531 B2
(45) Date of Patent: Jul. 9, 2013

(54) LIQUID CONTAINING BAG AND FROZEN DESSERT MANUFACTURING APPARATUS USING THE SAME

(75) Inventors: Kazuya Maeda, Kitaadachi-gun (JP); Tsuyoshi Kurosawa, Gyoda (JP); Takeshi Ishii, Fukaya (JP); Koichiro Ikemoto, Ora-gun (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 2862 days.

(21) Appl. No.: 10/519,832

(22) PCT Filed: Jul. 3, 2003

(86) PCT No.: PCT/JP03/08456
§ 371 (c)(1),
(2), (4) Date: Jan. 10, 2005

(87) PCT Pub. No.: WO2004/009463
PCT Pub. Date: Jan. 29, 2004

(65) Prior Publication Data
US 2006/0134275 A1    Jun. 22, 2006

(30) Foreign Application Priority Data

Jul. 19, 2002 (JP) ................................. 2002-210765
Oct. 31, 2002 (JP) ................................. 2002-318299

(51) Int. Cl.
*A23G 9/00*    (2006.01)

(52) U.S. Cl.
USPC ............................................. 62/342; 222/95

(58) Field of Classification Search
USPC ................. 62/342–343; 222/95, 389; 383/66, 383/109, 906
See application file for complete search history.

(56) References Cited

U.S. PATENT DOCUMENTS

| | | | |
|---|---|---|---|
| 4,796,788 A | 1/1989 | Bond | |
| 5,096,092 A * | 3/1992 | Devine | 222/95 |

(Continued)

FOREIGN PATENT DOCUMENTS

| | | |
|---|---|---|
| JP | 56-161969 | 12/1981 |
| JP | 59-26788 | 2/1984 |

(Continued)

OTHER PUBLICATIONS

Office Action dated Sep. 4, 2008 corresponding to Japanese Patent Application No. 318299/2002.

(Continued)

*Primary Examiner* — Cheryl J Tyler
(74) *Attorney, Agent, or Firm* — Kratz Quintos & Hanson, LLP

(57) ABSTRACT

There is provided a liquid containing bag capable of supplying mixture directly to a cooling cylinder from the bag without depending on gravity and without moving the mixture into a hopper. A liquid containing bag 5 comprises a bag main body 21 containing a liquid and having flexibility, and an outer layer member 23 disposed outside the bag main body 21, capable of forming a sealed space between the outer layer member and the bag main body 21, and having flexibility. Therefore, for example, when compressed air is sealed between the outer layer member 23 and the bag main body 21, an volume of the sealed space between them is enlarged, and the liquid cooled in the bag main body 21 can be pushed to the outside.

3 Claims, 9 Drawing Sheets

U.S. PATENT DOCUMENTS

| | | | |
|---|---|---|---|
| 6,220,047 B1 * | 4/2001 | Vogel et al. | 62/342 |
| 6,234,351 B1 * | 5/2001 | Wilcox | 222/95 |
| 6,494,055 B1 * | 12/2002 | Meserole et al. | 62/342 |

FOREIGN PATENT DOCUMENTS

| | | |
|---|---|---|
| JP | 63-123448 | 8/1988 |
| JP | 01-291751 | 11/1989 |
| JP | 1-291751 | 11/1989 |
| JP | 10-327760 | 12/1998 |
| JP | 2001-245603 | 9/2001 |
| WO | 98/54979 | 12/1998 |
| WO | 01/44072 | 6/2001 |

OTHER PUBLICATIONS

European Search Report dated Nov. 23, 2010.

* cited by examiner

LIQUID CONTAINING BAG AND FROZEN DESSERT MANUFACTURING APPARATUS USING THE SAME

BACKGROUND OF THE INVENTION

The present invention relates, for example, to a liquid containing bag for containing a liquid of a mixture or the like which is a raw material of a frozen dessert such as a soft ice cream, and a frozen dessert manufacturing apparatus using the bag.

This type of a frozen dessert manufacturing apparatus has heretofore comprised a cooling device constituted of a compressor, a condenser, a capillary tube, a cooling unit disposed in a cooling cylinder and a hopper (mixing tank). Pressure of a liquefied refrigerant is reduced, and the refrigerant is passed through the cooling unit to cool the cooling cylinder and hopper at the time of the manufacturing of the frozen dessert by the cooling device. Moreover, a beater is attached to the inside of the cooling cylinder, and mixture in the cooling cylinder is cooled by the cooling unit and stirred by the beater to manufacture frozen desserts such as soft ice cream and sherbet.

In this case, a system has been adopted in which the mixture is stored in a hopper, and passed into the cooling cylinder from the hopper by a mixture supplying unit. This mixture supplying unit has a pipe shape whose upper end is opened to the atmosphere and which communicates with the inside of the hopper in a lower end portion of the hopper, and a supply amount of the mixture depends on a head difference in the mixture supplying unit.

That is, since the supplying of the mixture into the cooling cylinder from the hopper depends on gravity, there is a disadvantage that the supply amount is not stable. Since the mixture contained in a raw material bag beforehand is unsealed and injected into the hopper, there has been a disadvantage that a hygienic problem occurs.

Therefore, there has been a demand for development of a frozen dessert manufacturing apparatus capable of supplying the mixture directly to the cooling cylinder from the raw material bag without depending on the gravity or without moving the mixture to the hopper, and manufacturing the frozen dessert. The present invention has been developed in order to solve the conventional technique problem.

SUMMARY OF THE INVENTION

According to the present invention, there is provided a liquid containing bag comprising: a bag main body containing a liquid and having flexibility; and an outer layer member disposed outside the bag main body, capable of forming a sealed space between the member and the bag main body, and having the flexibility.

The liquid containing bag of the present invention additionally comprises: an outlet member connecting the inside of the bag main body to the outside; and a communication port member connecting the space between the outer layer member and the bag main body to the outside.

In the above-described respective inventions, the frozen dessert manufacturing apparatus of the present invention comprises: a cold storage which cold-stores the liquid containing bag containing the mixture in the bag main body; a cooling cylinder which stirs and cools the mixture flowing out of the bag main body of the liquid containing bag to thereby manufacture frozen dessert; a cooling device which cools the cold storage or the cooling cylinder; and an air compression device which supplies compressed air between the outer layer member and the bag main body of the liquid containing bag and which pushes out the mixture in the bag main body.

According to the present invention, there is provided a frozen dessert manufacturing apparatus comprising: a cold storage which cold-stores a liquid containing bag constituted of a bag main body containing a mixture and having flexibility and an outer layer member disposed outside the bag main body, capable of forming a sealed space between the member and the bag main body, and having flexibility; a cooling cylinder which stirs and cools the mixture supplied from the liquid containing bag to thereby manufacture frozen dessert; a cooling device which cools the cold storage or the cooling cylinder; an air compression device; a mixture supply passage for connecting the inside of the bag main body of the liquid containing bag to the inside of the cooling cylinder; a bag pressurizing passage for supplying compressed air produced by the air compression device between the outer layer member and the bag main body of the liquid containing bag; and an air supply passage for supplying compressed air into the cooling cylinder.

The frozen dessert manufacturing apparatus of the present invention additionally comprises: a check valve which is in a forward direction on the side of the cooling cylinder in a path in which the mixture supplied to the cooling cylinder from the liquid containing bag flows and in a path in which the compressed air supplied to the cooling cylinder from the air compression device flows.

According to the present invention, there is provided a frozen dessert manufacturing apparatus comprising: a cold storage which cold-stores a liquid containing bag constituted of a bag main body containing a mixture and having flexibility and an outer layer member disposed outside this bag main body, capable of forming a sealed space between the outer layer member and the bag main body, and having flexibility; a cooling cylinder which stirs and cools the mixture supplied from the liquid containing bag to thereby manufacture frozen dessert; a cooling device which cools the cold storage or the cooling cylinder; an air compression device; a mixture supply passage for connecting the inside of the bag main body of the liquid containing bag to the inside of the cooling cylinder; a bag pressurizing passage for supplying compressed air produced by the air compression device between the outer layer member and the bag main body of the liquid containing bag; and an air supply passage for supplying compressed air into the cooling cylinder, wherein the mixture supply passage is combined with the air supply passage, and thereafter connected to the inside of the cooling cylinder.

The frozen dessert manufacturing apparatus of the present invention additionally comprises: a combined passage member detachably attached to the cooling cylinder and disconnectably connected to the mixture supply passage and the air supply passage.

The frozen dessert manufacturing apparatus of the present invention additionally comprises: check valves which are connected between the mixture supply passage and the combined passage member and between the air supply passage and the combined passage member and which are in a forward direction on the side of the combined passage member.

In addition to the above-described respective inventions, in the frozen dessert manufacturing apparatus of the present invention, the combined passage member is disposed in the cold storage.

In addition to the above-described respective inventions, in the frozen dessert manufacturing apparatus of the present invention, the mixture supply passage is disposed in the cold storage.

DETAILED DESCRIPTION OF THE PREFERRED EMBODIMENTS

An embodiment of the present invention will be described hereinafter with reference to the drawings.

Figure 1:
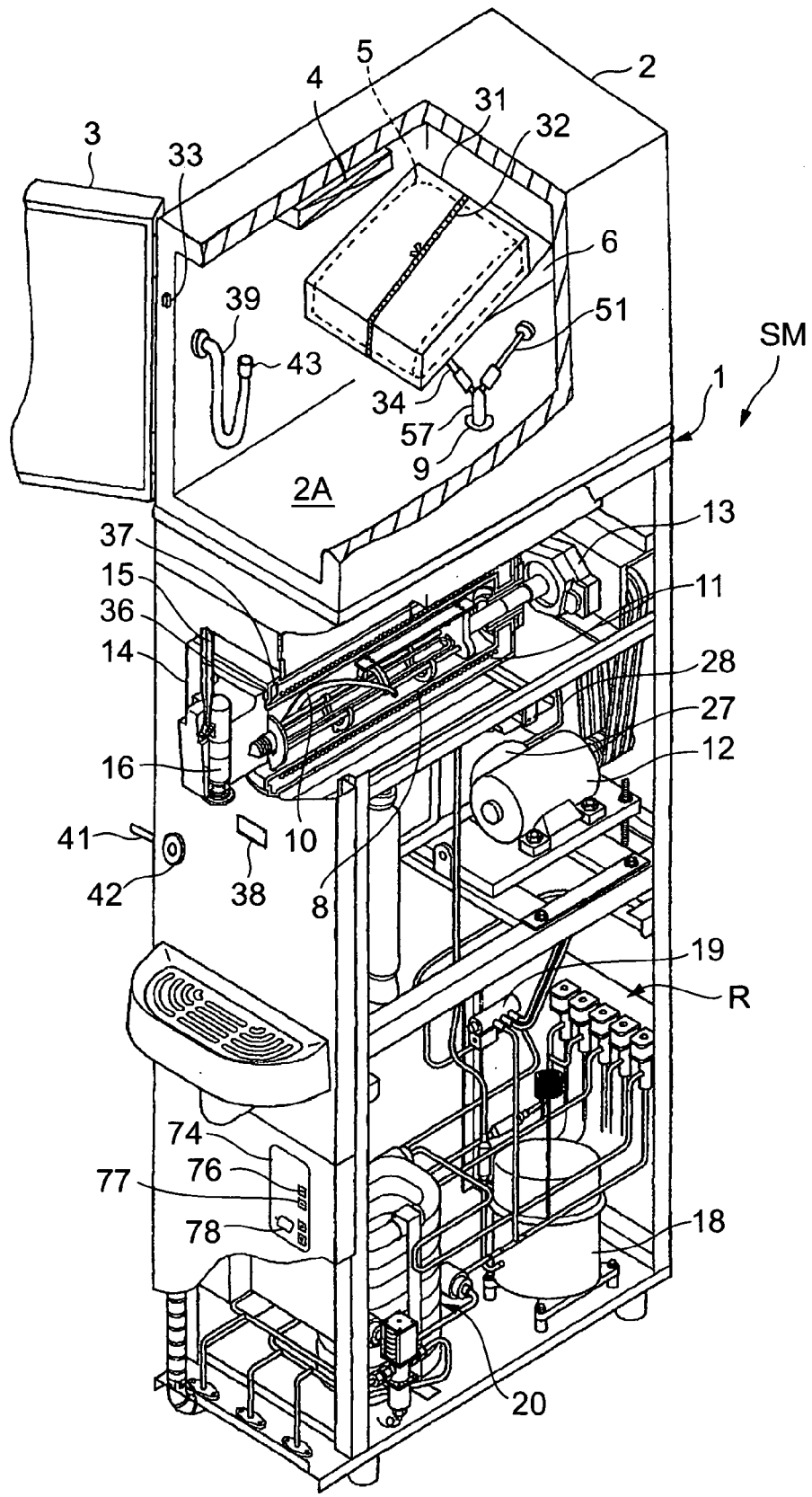
FIG. 1 is a partially vertical perspective view of a frozen dessert manufacturing apparatus to which the present invention is applied.

A frozen dessert manufacturing apparatus SM of the embodiment is an apparatus for manufacturing/selling frozen dessert (it is assumed in the embodiment that soft ice cream is manufactured) such as soft ice cream or sherbet (shake). In FIG. 1, on a main body 1, a heat-insulating cold storage 2 is disposed for storing/keeping cold a mixed raw material bag 5 which is a liquid containing bag containing a raw material mixture (mixture which is a frozen-dessert raw material of soft ice cream, sherbet or the like) of the soft ice cream. A storage inside 2A of the cold storage 2 opens in a front face, this front face opening is openably closed by a rotatable heat-insulating door 3, and this heat-insulating door 3 is opened at the time of changing of the mixed raw material bag 5. It is to be noted that reference numeral 33 denotes a cold storage open/close switch for detecting opening/closing of the heat-insulating door 3.

On the other hand, a cold storage cooling unit 4 and an air blower (not shown) are disposed in a ceiling part of the storage inside 2A of the cold storage 2. Cold air cooled by this cold storage cooling unit 4 is circulated in the storage inside 2A to keep cold the mixed raw material bag 5 in the cold storage 2 or peripheral parts described later at a predetermined temperature.

It is to be noted that the mixed raw material bag is detachably contained in a cover 31 of nylon or the like having a predetermined strength, and contained in the cold storage 2 in this state. This cover 31 is a bag whose upper surface is openably closed by a fastener 32, and a pipe connection portion (not shown) for discharge from an outlet member 22 and a communication port member 24 of the mixed raw material bag 5 described later is formed in a lower surface of the cover. When the mixed raw material bag 5 is contained in this cover 31, and if the mixture leaks from the mixed raw material bag 5, a disadvantage that the storage inside 2A is contaminated/damaged is avoided or suppressed. Since bulging of the mixed raw material bag 5 at the time of the supplying of compressed air is regulated by the cover 31 as described later, occurrence of disruption of the mixed raw material bag 5 can be avoided.

In this cold storage 2, a holding base 6 for obliquely holding the mixed raw material bag 5 in such a manner that the bag is low on a front side is disposed. A bag pressurizing pipe 7 (shown in FIG. 2) constituting a bag pressurizing passage is drawn into the storage inside 2A from an inner wall of the cold storage 2. Furthermore, a mixture inlet 9 of a cooling cylinder 8 described later is opened/disposed in a bottom wall of the storage inside 2A of the cold storage 2.

Figure 2:
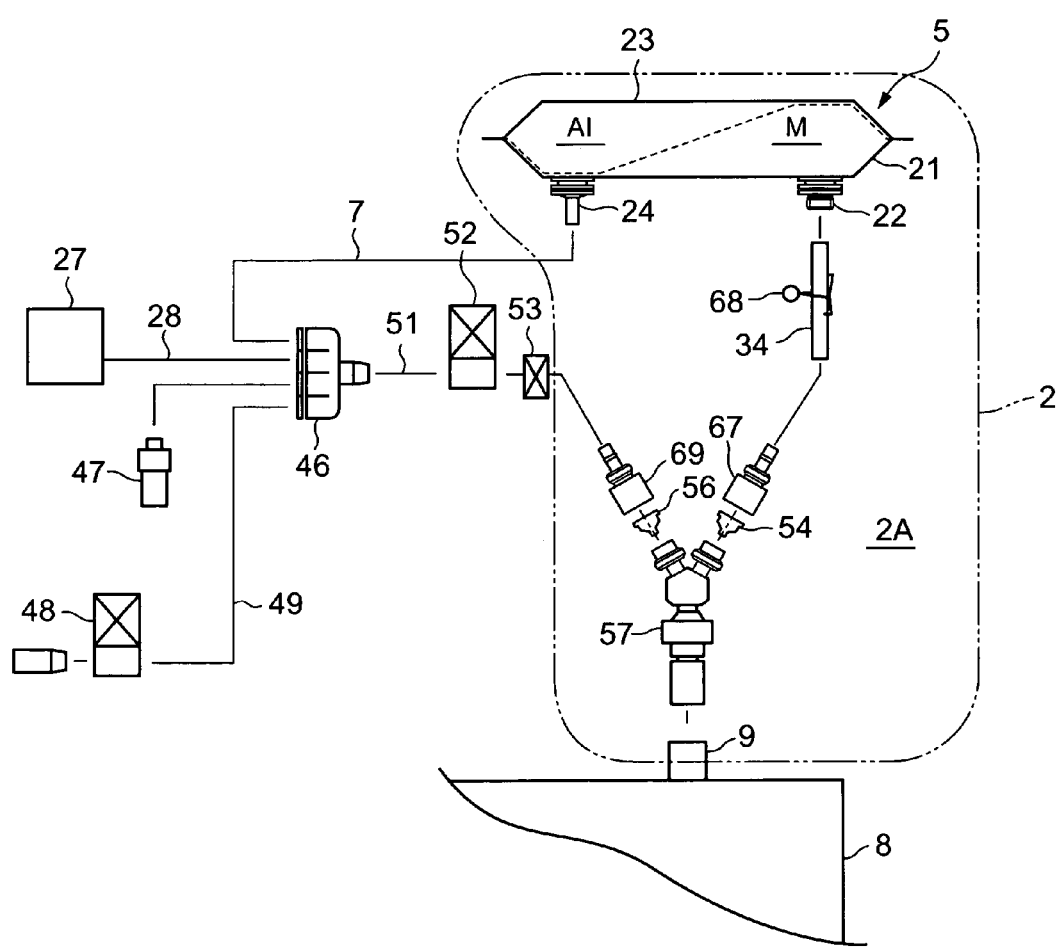
FIG. 2 is a constitution diagram concerning mixture supply of the frozen dessert manufacturing apparatus of FIG. 1.

Here, the mixed raw material bag (liquid containing bag in the present invention) 5 comprises: an aluminum evaporated resin bag main body 21 having flexibility; the outlet member 22 (sealed by a sealing material when unused) connecting the inside of the bag main body 21 to the outside and formed of a hard resin; a flexible outer layer member 23 whose periphery is fusion-bonded to the other surface of the bag main body 21 and which is formed of the same material as that of the bag main body 21; and the communication port member 24 attached to one surface of the bag main body 21 in such a manner as to communicate with a non-bonded portion described later between the outer layer member 23 and the bag main body 21 and formed of the hard resin (FIG. 2).

The outer layer member 23 is not bonded to the bag main body 21 except the periphery of the outer layer member 23, and accordingly a sealed space can be constituted between the outer layer member 23 and the bag main body 21. Moreover, the communication port member 24 connects a space (sealed space) between the outer layer member 23 and the bag main body 21 to the outside. Mixture (shown by M in FIG. 2) is contained in the bag main body 21, and it is possible to supply compressed air (shown by AI in FIG. 2) to the sealed space between the outer layer member 23 and the bag main body 21.

As described above, the mixed raw material bag 5 containing the mixture is contained in the cover 31 as described above, contained in the storage inside 2A of the cold storage 2, and inclined/held on the holding base 6. At this time, the bag is laid in such a manner that the outlet member 22 and the communication port member 24 are disposed downwards. In this arrangement, even when the mixed raw material bag 5 bulges, a sufficient interval is held from the ceiling of the storage inside 2A, and cold air circulation can be secured. Each pipe or tube can be easily connected. Moreover, one end of the bag pressurizing pipe 7 is detachably connected to the communication port member 24, and communicates with the space (sealed space) between the outer layer member 23 and the bag main body 21. The outlet member 22 is detachably connected to one end of a mixed raw material tube 34 constituting a mixture supply passage. The mixed raw material tube 34 comprises a flexible tube.

On the other hand, in FIG. 1, reference numeral 8 denotes the cooling cylinder which rotates/stirs the mixture flowing into the mixture inlet 9 by a beater 10 to manufacture frozen dessert, and a cylinder cooling unit 11 is attached to the periphery of the cylinder. The beater 10 is rotated via a beater motor 12, a driving transmission belt, a speed reducer 13, and a rotation shaft. The manufactured frozen dessert is taken out, when a plunger 16 vertically moves by operation of a take-out lever 15 disposed on a freezer door 14 openably closing the front surface opening of the cooling cylinder 8, an extraction path (not shown) is opened, and the beater 10 is rotated/driven. The freezer door 14, take-out lever 15, and plunger 16 constitute a frozen dessert extraction unit.

The freezer door 14 is formed of transparent glass, or transparent hard resin to constitute a see-through unit. The inside of the cooling cylinder 8 can be seen through the freezer door 14 from a front side. A permanent magnet 36 is buried in the surface of the freezer door 14 on the side of the main body 1, and a lead switch 37 is attached to the front surface of the main body 1 in a position corresponding to the permanent magnet 36. Moreover, when the freezer door 14 is attached to the main body 1, and the front surface opening of the cooling cylinder 8 is closed, a contact of this lead switch 37 is closed by the permanent magnet 36. When the freezer door 14 is remove to open the front surface opening of the cooling cylinder 8, the contact of the lead switch 37 is opened.

Moreover, a proximity switch (proximity sensor) 38 is attached to the front surface of the main body 1 in a position under the take-out lever 15 constituting the frozen dessert extraction unit. This proximity switch 38 detects that a container such as a cone or paper cup to contain frozen dessert is disposed under the take-out lever 15 using infrared rays or sound waves.

Furthermore, a cleaning hose 39 is attached to the storage inside 2A of the cold storage 2 as shown in FIG. 1. The cleaning hose 39 is disposed in order to discharge cleaning water into the cooling cylinder 8 during cleaning in the cooling cylinder 8, extends downwards through the main body 1, and is connected to a cleaning water piping 41 drawn out to the side surface. This cleaning water piping 41 is connected to a city water pipe (not shown), and further an open/close plug 42 is disposed halfway in the cleaning water piping 41, and positioned on the front surface of the main body 1. This open/close plug 42 constantly closes the cleaning water piping 41, and is turned to thereby open the cleaning water piping 41 when cleaning the cooling cylinder 8.

Moreover, a connector 43 is attached to a tip of the cleaning hose 39, and the connector 43 is detachably connected to the mixture inlet 9 of the cooling cylinder 8. In this case, the connector 43 has a mechanism which constantly closes a tip opening of the cleaning hose 39 (therefore cleaning water does not come out, even when the open/close plug 42 is opened in this state) and which opens when connected to the mixture inlet 9. Accordingly, a connecting operation into the mixture inlet 9 is remarkably facilitated.

A compressor 18, a condenser 20, a four-way valve 19 and the like constituting a cooling device R are contained/disposed in a lower part of the main body 1. It is to be noted that the four-way valve 19 passes a high-temperature refrigerant through the cylinder cooling unit 11 to perform thawing/sterilizing.

Next, in FIG. 2, reference numeral 27 denotes an air pump constituting an air compression device, and a discharge pipe 28 of the air pump is connected to a distributor 46. Moreover, the distributor 46 is connected to the other end of the bag pressurizing pipe 7. Furthermore, the distributor 46 is connected to a sensor (pressure sensor) 47 in an air circuit and an exhaust pipe 49 constituting pressure detection means, and the exhaust pipe 49 is connected to an exhaust electromagnetic valve 48 (for protecting the air pump and exhausting the air circuit) in the air circuit, constituting exhaust means.

Furthermore, the distributor 46 is connected to one end of an air circuit 51 which is the air supply passage. Accordingly, the bag pressurizing pipe 7, air circuit 51, air pump 27, the sensor 47 in the air circuit, and the exhaust pipe 49 communicate with one another via the distributor 46 in a branched/connected state. An air circuit open/close electromagnetic valve 52 and an air filter 53 which are channel opening/closing means are disposed in the air circuit 51. The air filter 53 captures and removes foreign matters or miscellaneous bacteria in the compressed air flowing into the air circuit 51.

Moreover, the other end of the mixed raw material tube 34 and the other end of the air circuit 51 are disconnectably connected to two inlets of a Y-type mixing unit 57 which is a combined passage member via check valves 54, 56, respectively. In either of the check valves 54, 56, the direction of the Y-type mixing unit 57 is assumed as a forward direction. The outlet of the Y-type mixing unit 57 is disconnectably connected to the mixture inlet 9 of the cooling cylinder 8. The mixed raw material bag 5, the mixed the raw material tube 34, the other end portion of the air circuit 51, one end portion of the bag pressurizing pipe 7, and the Y-type mixing unit 57 are positioned in the storage inside 2A of the cold storage 2, and kept cold. Therefore, the temperature of the mixture does not rise in the process of flowing through the mixed raw material tube 34.

Figure 3:
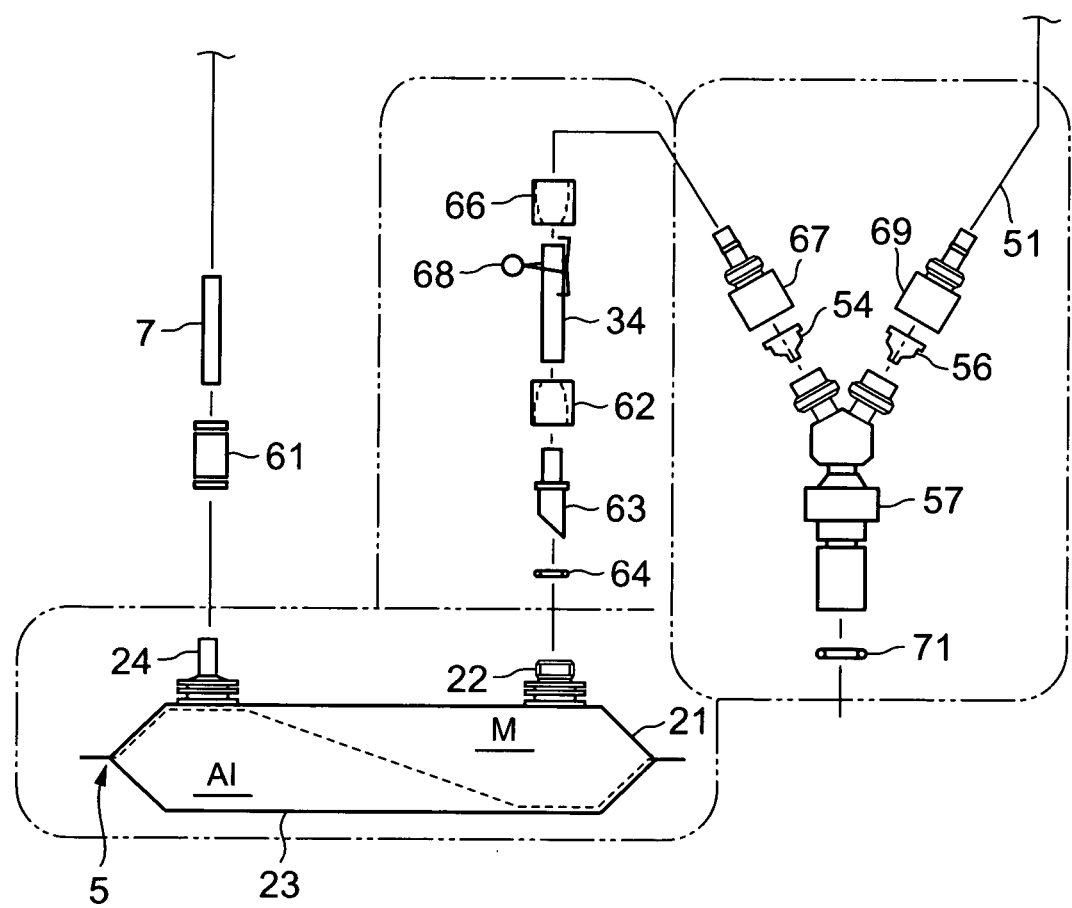
FIG. 3 is an exploded constitution diagram of parts around a mixed raw material bag (liquid containing bag)

Here, a concrete connection structure of the bag pressurizing pipe 7, the mixed raw material tube 34, the air circuit 51, or the Y-type mixing unit 57 will be described with reference to FIG. 3. The bag pressurizing pipe 7 also comprises a tube having flexibility, and is disconnectably connected to the communication port member 24 of the mixed raw material bag 5 by a one-touch joint 61. One end of the mixed raw material tube 34 is disconnectably connected to the outlet member 22 of the mixed raw material bag 5 via an O ring 64 by an attachment nut 62 and a connection pipe 63 whose tip has an arrowhead shape. This outlet member 22 first is sealed with a sealing material as described above. However, when the connection pipe 63 is inserted, the O ring 64 seals the inside of the outlet member 22. Simultaneously or thereafter, the sealing material is broken in the tip.

Moreover, the other end of the mixed raw material tube 34 is disconnectably connected to one inlet of the Y-type mixing unit 57 by an attachment nut 66 and a connection pipe 67 (containing the check valve 54). Since the mixed raw material tube 34 is a flexible tube as described above, the tube can be easily sealed when held by a pinch 68. Additionally, it is assumed that the pinch 68 is opened at the time of usual use.

On the other hand, the other end of the air circuit 51 is disconnectably connected to the other inlet of the Y-type mixing unit 57 by a connection pipe 69 (containing the check valve 56). Moreover, the outlet of the Y-type mixing unit 57 is disconnectably connected to the mixture inlet 9 of the cooling cylinder 8 via an O ring 71. The mixed raw material tube 34, Y-type mixing unit 57, check valves 54, 56 and the like are easily cleaned by disconnectable connection.

Figure 4:
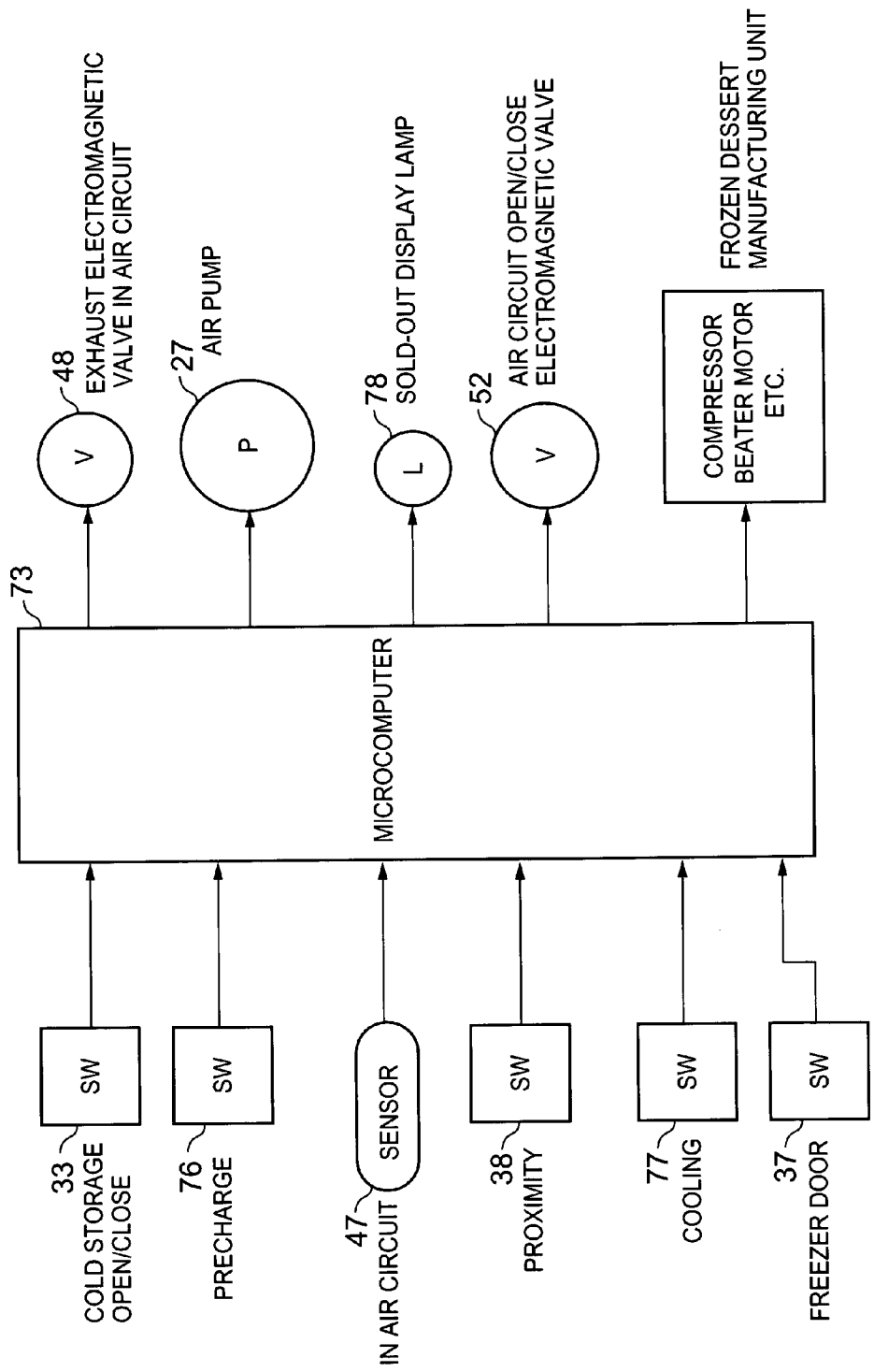
FIG. 4 is a block diagram of an electric circuit of the frozen dessert manufacturing apparatus of FIG. 1.

Next, in FIG. 4, reference numeral 73 is a general-purpose microcomputer constituting control means, and inputs of the microcomputer 73 are connected to the cold storage open/close switch 33, the sensor 47 in the air circuit, the proximity switch 38, and the lead switch 37. The inputs of the microcomputer 73 are further connected to a pre-charge switch (operation switch) 76 and a cooling switch 77 disposed on a control panel 74 of the main body 1.

Furthermore, outputs of the microcomputer 73 are connected to a frozen dessert manufacturing unit comprising the compressor 18, beater motor 12, and the like of the above-described cooling device R, and additionally to the exhaust electromagnetic valve 48 in the air circuit, the air pump 27, and the air circuit open/close electromagnetic valve 52. Furthermore, the output of the microcomputer 73 is also connected to a sold-out display lamp 78 disposed on the operation panel 74.

Next, an operation of the above-described constitution will be described. When a power plug (not shown) of the frozen dessert manufacturing apparatus SM is connected to a power supply to turn on the power supply, the microcomputer 73 first judges whether or not the contact of the lead switch 37 is closed. Moreover, when the freezer door 14 is attached to close the front surface opening of the cooling cylinder 8, and the permanent magnet 36 closes the contact of the lead switch 37, a subsequent operation is allowed to start. However, when the freezer door 14 is not normally attached, and the contact of the lead switch 37 opens, the following operation is prohibited from being started. For example, the sold-out display lamp 78 blinks, and warning is displayed. Accordingly, the operation in a state in which the freezer door 14 is forgotten to be attached or is not normally attached is prevented from being started, and a user is urged to attach the freezer door 14.

Figure 5:
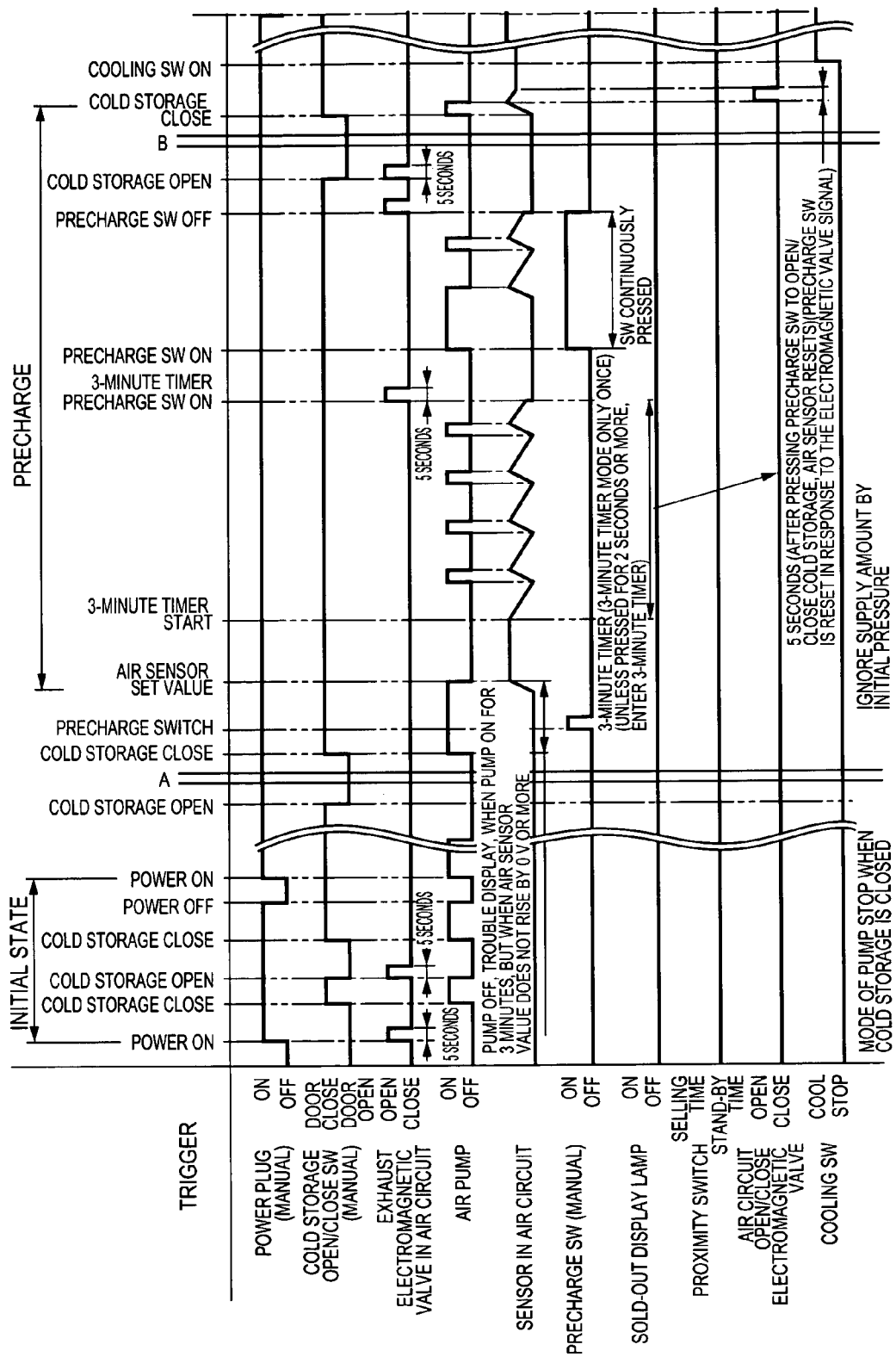
FIG. 5 is a timing chart showing supplying of mixture to manufacturing of frozen dessert, and extracting of the frozen dessert in the frozen dessert manufacturing apparatus of FIG. 1.

Next, the supplying of the mixture to the manufacturing of the frozen dessert, and the extracting of the frozen dessert will be described with reference to timing charts of FIGS. 5 and 6. It is to be noted that the mixed raw material bag 5 contained in the cover 31 as described above is set in the storage inside 2A of the cold storage 2, and the bag pressurizing pipe 7, the mixed raw material tube 34, and the Y-type mixing unit 57 are also connected as shown in FIG. 2. Additionally, the air circuit 51 including the check valve 56 is detached from the Y-type mixing unit 57 at a time when pre-charging is started.

(1) Initial State

In an initial state from when power supply turns on in FIG. 1, the microcomputer 73 first opens the exhaust electromagnetic valve 48 in the air circuit for a predetermined period (five seconds in the embodiment). Thereafter, after the mixed raw material bag 5 is set in the storage inside 2A of the cold storage 2 as described above, the closing of the heat-insulating door 3 is detected based on a detection operation of the cold storage open/close switch 33, and then the microcomputer 73 operates the air pump 27. Thereafter, when the heat-insulating door 3 of the cold storage 2 is opened, the microcomputer 73 stops the air pump 27 based on the detection operation of the cold storage open/close switch 33. Moreover, the exhaust electromagnetic valve 48 in the air circuit is opened for the predetermined period (5 seconds) to exhaust air from the air circuit 51 or the bag pressurizing pipe 7.

That is, the microcomputer 73 stops the air pump 27 in a case where the heat-insulating door 3 of the cold storage 2 is opened, and permits the operation of the air pump 27 only in a case where the heat-insulating door 3 is closed. Accordingly, safety is enhanced in attaching/detaching the pipe and the like during the changing of the mixed raw material bag 5. Especially, when the heat-insulating door 3 is opened, the exhaust electromagnetic valve 48 in the air circuit is opened to exhaust the compressed air from the air circuit 51 or the bag pressurizing pipe 7, and therefore a disadvantage that the compressed air blows out can be securely avoided in attaching/detaching the pipe.

It is to be noted that the air pump 27 is stopped, and the sold-out display lamp 78 is allowed to blink to thereby make a warning in a case where the sensor 47 in the air circuit does not detect any pressure rise in the bag pressurizing pipe 7 (including the sealed space between the bag main body 21 and the outer layer member 23 of the mixed raw material bag 5 communicating with the bag pressurizing pipe 7) connected to the distributor 46 or the air circuit 51 even with elapse of three minutes after the air pump 27 is operated in the initial state.

(2) Pre-Charge Mode

Next, when a user turns on the pre-charge switch 76 (presses the switch less than two seconds), the microcomputer 73 enters the pre-charge mode to start pre-charging. In this pre-charge mode, the microcomputer 73 operates the air pump 27, and supplies compressed air into the bag pressurizing pipe 7 (including the sealed space between the bag main body 21 and the outer layer member 23 of the mixed raw material bag 5 communicating with the bag pressurizing pipe 7) connected to the distributor 46 or the air circuit 51 (the air circuit open/close electromagnetic valve 52 is closed in the pre-charge mode).

Moreover, when the air pressure detected by the sensor 47 in the air circuit rises to a set value, the microcomputer 73 stops the air pump 27 based on the output of the sensor 47 in the air circuit. Thereafter, the microcomputer 73 starts counting of a three-minute timer (not limited to three minutes and predetermined) which is its own function.

When the compressed air is fed into the sealed space between the outer layer member 23 and the bag main body 21 of the mixed raw material bag 5 from the bag pressurizing pipe 7, a certain pressure is applied to the bag main body 21 from the outside. Accordingly, when a volume of the sealed space between the outer layer member 23 and the bag main body 21 is enlarged, the mixture in the bag main body 21 is pushed out to the mixed raw material tube 34 from the outlet member 22. The mixture pushed out into the mixed raw material tube 34 flows into the cooling cylinder 8 from the mixture inlet 9 via the check valve 54 and the Y-type mixing unit 57. At this time, since the air circuit 51 including the check valve 56 is removed, the air in the cooling cylinder 8 goes out of the other outlet of the Y-type mixing unit 57. Accordingly, the mixture also smoothly flows into the cooling cylinder 8.

When the mixture flows out of the mixed raw material bag 5, the volume of the sealed space between the outer layer member 23 and the bag main body 21 is enlarged, and therefore air pressure in the pipe extending to the distributor 46 from the bag pressurizing pipe 7 also drops. Moreover, when the sensor 47 in the air circuit detects that the pressure drops to a predetermined lower limit value, the microcomputer 73 operates the air pump 27 to restart the supplying of the compressed air. The operation panel 74 repeats this, and maintains the air pressure detected by the sensor 47 in the air circuit (air pressure of the sealed space between the outer layer member 23 and the bag main body 21 of the mixed raw material bag 5) between the set value and the lower limit value (predetermined pressure in a range of the set value and the lower limit value).

Thereafter, the counting of the three-minute timer is continued until ended, and the mixture is supplied into the cooling cylinder 8. Accordingly, the mixture is stored in the cooling cylinder 8. When the counting of the three-minute timer ends, the microcomputer 73 stops the operation of the air pump 27, opens the exhaust electromagnetic valve 48 in the air circuit for five seconds to once discharge the compressed air. The user confirms a liquid level of the mixture in the cooling cylinder 8 via the transparent freezer door 14, and continues to press the pre-charge switch 76 (ON for two seconds or more) in a case where a predetermined liquid level is not satisfied.

When the pre-charge switch 76 continues to be turned on, the microcomputer 73 operates the air pump 27 to start the supplying of the compressed air again, and maintains the air pressure (air pressure of the sealed space between the outer layer member 23 and the bag main body 21 of the mixed raw material bag 5) detected by the sensor 47 in the air circuit as described above at the set value. Accordingly, the mixture is supplied into the cooling cylinder 8 from the mixed raw material bag 5 again. Moreover, the user visually confirms that the mixture in the cooling cylinder 8 is stored to a predetermined liquid level. When the pre-charge switch 76 is released (OFF), the microcomputer 73 stops the air pump 27, and opens the exhaust electromagnetic valve 48 in the air circuit to discharge the compressed air between the outer layer member 23 and the bag main body 21 of the mixed raw material bag 5. Accordingly, the supplying of the mixture is stopped, and the mixture is stored up to the predetermined liquid level in the cooling cylinder 8.

When this pre-charge is disposed in the microcomputer 73, the mixture can be smoothly stored in the cooling cylinder 8 at a time when the shop is opened. Especially, since the pre-charge switch 76 is disposed, and the pre-charging can be manually started, usability becomes satisfactory.

It is to be noted that in the above-described embodiment, the three-minute timer and the pre-charge switch 76 is continuously pressed while seeing through the cooling cylinder 8 from the freezer door 14. Accordingly, the mixture is stored up to the predetermined liquid level in the cooling cylinder 8, but the present embodiment is not limited to this. A liquid level sensor may be disposed in a height of the predetermined liquid level of the cooling cylinder 8 to execute automatic control. In this case, the microcomputer 73 enters the pre-charge mode based on the operation of the pre-charge switch 76 to start the pre-charging. Moreover, when the mixture in the cooling cylinder 8 reaches the predetermined liquid level, the microcomputer stops the air pump 27, and opens the exhaust electromagnetic valve 48 in the air circuit to end the supplying of the mixture in the same manner as described above based on the output of the liquid level sensor. According to this control, an operation to store the mixture to the predetermined liquid level in the cooling cylinder 8 after instructed to start the pre-charging by the pre-charge switch 76 can be automated.

After storing the mixture to the predetermined liquid level in the cooling cylinder 8 in this manner, the heat-insulating door 3 is opened, and the air circuit 51 is connected to the other inlet of the Y-type mixing unit 57 in the storage inside 2A of the cold storage 2 (the check valve 54 is also attached). Moreover, the heat-insulating door 3 is closed. When the heat-insulating door 3 is opened, as described above the microcomputer 73 stops the air pump 27, and opens the exhaust electromagnetic valve 48 in the air circuit to discharge the compressed air. However, when the heat-insulating door 3 is closed after connected to the air circuit 51, the microcomputer operates the air pump 27 to raise the air pressure (air pressure of the bag pressurizing pipe 7 including the sealed space between the outer layer member 23 and the bag main body 21 of the mixed raw material bag 5, the distributor 46, and the air circuit open/close electromagnetic valve 52 in the air circuit 51) to the set value.

When the air pressure detected by the sensor 47 in the air circuit rises to the set value, the microcomputer 73 opens the air circuit open/close electromagnetic valve 52 for a predetermined period (e.g., five seconds), and supplies the compressed air into the air circuit 51 extending to the Y-type mixing unit 57. The mixture is inhibited from being fed into the cooling cylinder 8 from the mixed raw material tube 34 by the pressure of the compressed air flowing into the cooling cylinder 8 from the air circuit 51 through the Y-type mixing unit 57.

At this time, overrun (state in which air is mixed into the frozen dessert and bulk increases) of the frozen dessert is obtained by the amount of the compressed air flowing into the cooling cylinder 8, but the liquid level of the mixture stored in the cooling cylinder 8 can be defined at a predetermined liquid level by the operation of the pre-charge switch 76 or the position of the liquid level sensor as described above. Therefore, the air amount in the cooling cylinder 8 can be defined, and accordingly the overrun amount of the frozen dessert can be correctly set.

Moreover, since the compressed air flowing into the cooling cylinder 8 passes through the air filter 53 at this time, foreign matters or miscellaneous bacteria included in the air are captured by the air filter 53. Accordingly, a disadvantage that the foreign matters or the miscellaneous bacteria are mixed into the cooling cylinder 8 together with the compressed air can be avoided, and hygiene management can be securely performed.

Furthermore, since the mixed raw material tube 34 is provided with the check valve 54, the disadvantage that the compressed air supplied into the Y-type mixing unit 57 from the air circuit 51 flows into the bag main body 21 of the mixed raw material bag 5 via the mixed raw material tube 34 is inhibited.

Additionally, after the mixed raw material tube 34 is combined with the air circuit 51 in the Y-type mixing unit 57 as described above, the mixture inlet 9 communicates with the inside of the cooling cylinder 8. Therefore, the mixture can be supplied into the cooling cylinder 8, and air for overrun can be supplied via the single mixture inlet 9, and the structure of the cooling cylinder 8 is simplified.

As described above, the pre-charge mode ends. The microcomputer waits for the operation of the cooling switch 77 in this state. It is to be noted that the microcomputer 73 counts and holes a pre-charge time required for storing the mixture to the predetermined liquid level in the cooling cylinder 8 as described above from when the cooling switch 77 is first operated. In this case, when the cooling switch 77 is operated by visual check as described above to thereby store the mixture to the predetermined liquid level, the counting of the pre-charge time ends at a time when the pre-charge switch 77 is finally released. When the mixture is stored to the predetermined liquid level by the liquid level sensor as described above, the counting of the pre-charge time ends at a time when the liquid level sensor detects the predetermined liquid level of the mixture.

(3) Usual Selling Mode

Figure 6:
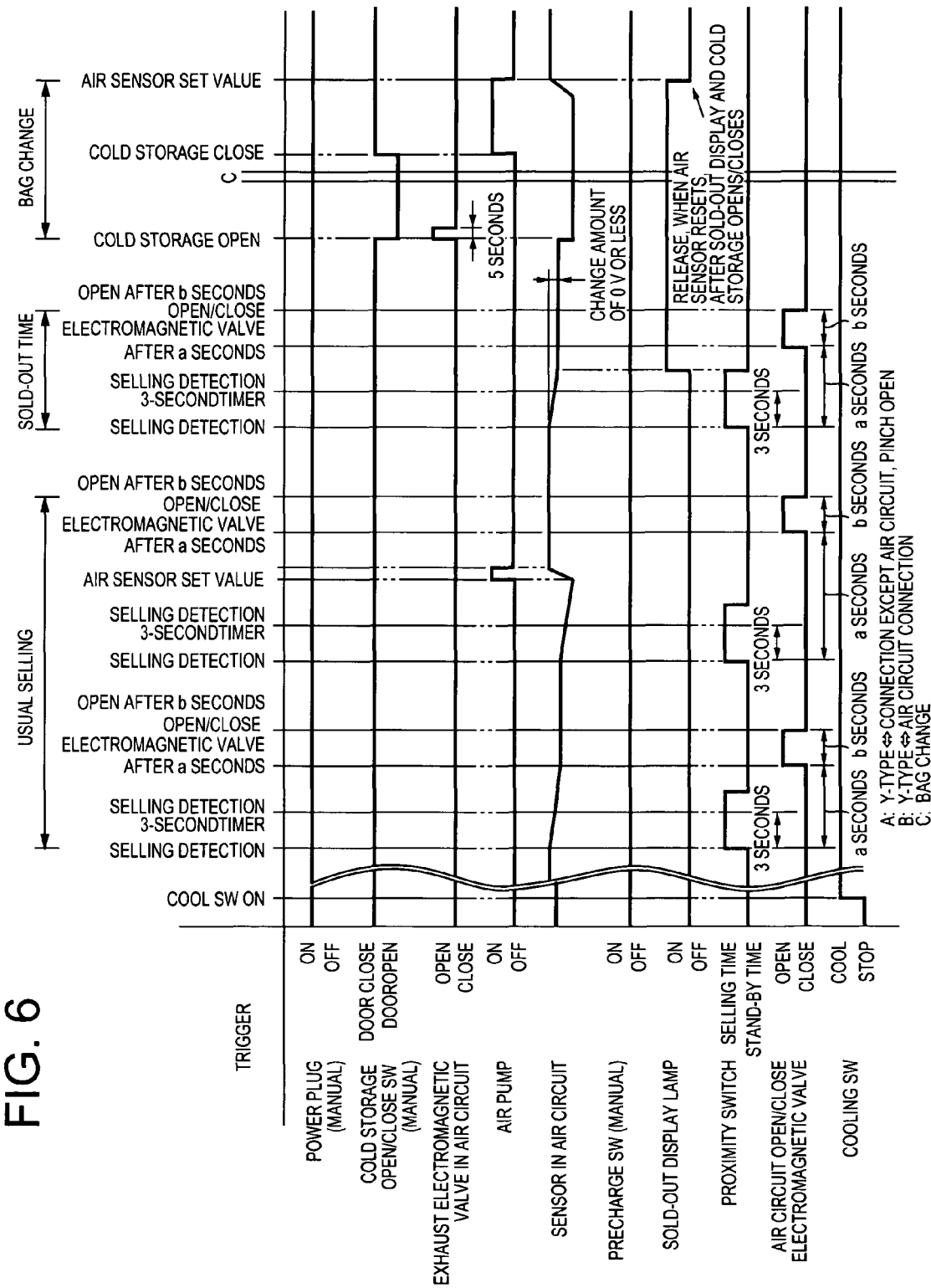
FIG. 6 is a timing chart similarly showing the supplying of the mixture to the manufacturing of the frozen dessert, and the extracting of the frozen dessert in the frozen dessert manufacturing apparatus of FIG. 1.

Next, turning to FIG. 6, when the user turns on (presses) the cooling switch 77, the microcomputer 73 operates the compressor 18 of the cooling device R to start a cooling operation on condition that the freezer door 14 is normally attached and closed as described above. When the compressor 18 is operated, refrigerant condensed by the condenser 20 is supplied to the respective cooling units 4, 11 via a pressure reducing device (not shown), and evaporated there to thereby exert a cooling function. Accordingly, the mixture of the mixed raw material bag 5 of the storage inside 2A of the cold storage 2 is kept cold. Since the mixture raw material tube 68 in the storage inside 2A, the other end portion of the air circuit 51, and parts (surrounded with a two-dot chain line in FIG. 2) including the Y-type mixing unit 57 are also kept cold, the temperature of the mixture or the compressed air flowing into the cooling cylinder 8 does not rise in the process of passage as described later.

On the other hand, the mixture is cooled at a freezing temperature by the cylinder cooling unit 11 in the cooling cylinder 8. Moreover, the microcomputer 73 rotates the beater 10 by the beater motor 12. Therefore, frozen dessert (soft ice cream) in a half hardened state is manufactured in the cooling cylinder 8. Thereafter, a selling standby state results.

In this state, the user disposes, for example, a cone (container) under the take-out lever 15, and brings the cone close to the proximity switch 38. Then, the proximity switch 38 detects the cone and turns on (selling detection). When the proximity switch 38 turns on, the microcomputer 73 starts the counting of a selling detection three-second (predetermined period not limited to three seconds) timer which is its own function. Moreover, when this state continues for three seconds, and the timer ends the counting, that is, when the proximity switch 38 continuously detects the cone for three seconds, the microcomputer 73 rotates the beater 10. Moreover, when the user operates the take-out lever 15, the plunger 16 moves up as described above. Therefore, the frozen dessert (soft ice cream) is pushed out to an extraction path (not shown) by the beater 10, and extracted into the cone.

Since the rotation of the beater 10 is controlled using the proximity switch 38 in this manner, it is not necessary to dispose the take-out switch using the arm cooperating with the vertical movement of the plunger 16 as in the conventional art, the number of parts is reduced, further a mechanism is simplified, and therefore a trouble does not easily occur. Moreover, the beater 10 is rotated in a case where the cone is continuously detected for a predetermined period (three seconds). Therefore, an erroneous operation caused in a case where a hand is placed over the vicinity of the proximity switch 8 by mistake can be prevented.

It is to be noted that when the take-out lever 15 is returned, the plunger 16 moves downwards to close the extraction path. Moreover, when the cone is detached from the proximity switch 38, the microcomputer 73 stops the beater 10. Accordingly, the extraction of the frozen dessert stops. When the frozen dessert is extracted from the cooling cylinder 8, the pressure drops. Therefore, the mixture flows into the cooling cylinder 8 from the mixture inlet 9 through the mixed raw material tube 34, check valve 54, and Y-type mixing unit 57 from the bag main body 21 of the mixed raw material bag 5, and is replenished.

In this case, since the check valve 56 is disposed in the air circuit 51, the disadvantage that the mixture supplied into the Y-type mixing unit 57 from the mixed raw material tube 34 flows into the air circuit 51 is avoided at this time. Therefore, the air circuit 51 on an upstream side from the check valve 56 does not have to be cleaned.

On the other hand, the microcomputer 73 opens the air circuit open/close electromagnetic valve 52 for b seconds (predetermined period) after a-seconds (delay time) from the selling detection. When the air circuit 51 opens by the air circuit open/close electromagnetic valve 52, the mixture is inhibited from being passed into the cooling cylinder 8 from the mixed raw material tube 34 by the pressure of the compressed air flowing into the cooling cylinder 8 through the Y-type mixing unit 57 from the air circuit 51, and the operation stops in the same manner as described above. That is, when the air circuit open/close electromagnetic valve 52 is opened with delay from the start of the extraction of the frozen dessert from the cooling cylinder 8, the mixture can be replenished into the cooling cylinder 8 from the mixed raw material tube 34.

It is to be noted that the air circuit open/close electromagnetic valve 52 opens continuously for b seconds in the embodiment of FIG. 6, but the air circuit open/close electromagnetic valve 52 may be intermittently opened/closed a plurality of times after a-seconds.

Here, although the replenishment amount of the mixture is determined by a delay time of a-seconds, the amount of the mixture flowing into the cooling cylinder 8 differs with viscosity of the mixture for the delay time. That is, a replenishment amount decreases with the same delay time in a case where the viscosity of the mixture is high. When the viscosity is low, the replenishment amount increases. On the other hand, when the viscosity of the mixture is high, a time (pre-charging time) required for the pre-charging lengthens. When the viscosity is low, the time shortens.

Then, based on the pre-charge time counted and held as described above, the microcomputer 73 lengthens the delay time of a-seconds in a case where the pre-charge time is long, and shortens the time in a case where the pre-charge time is short. Accordingly, the amount of the mixture replenished into the cooling cylinder 8 can be constantly set to be substantially certain regardless of the viscosity of the mixture with the extraction of the frozen dessert, and both excessive replenishment of the mixture into the cooling cylinder 8 and the shortage of the mixture in the cooling cylinder 8 can be avoided.

Here, the microcomputer 73 controls ON/OFF of the air pump 27 in order to maintain the pressure detected by the sensor 47 in the air circuit at the above-described set value. With the above-described extraction of the frozen dessert, the mixture flows out of the mixed raw material bag 5. Since the air flows into the cooling cylinder 8 from the air circuit 51, the pressure detected by the sensor 47 in the air circuit gradually drops, but the pressure drops to a lower limit value, when the extraction is performed approximately five times, and the air pump 27 is operated.

Therefore, in most cases excluding very few situations in which the extraction is continuously performed six times or more, the air pump 27 is not operated while the air circuit open/close electromagnetic valve 52 is opened for b seconds as described above. Therefore, the compressed air in the sealed space between the outer layer member 23 and the bag main body 21 of the mixed raw material bag 5 enters the air circuit 51 via the bag pressurizing pipe 7 and the distributor 46 for b seconds, and flows into the cooling cylinder 8 via the air circuit open/close electromagnetic valve 52, air filter 53, and Y-type mixing unit 57.

The compressed air in the sealed space between the outer layer member 23 and the bag main body 21 of the mixed raw material bag 5 is air cooled in the storage inside 2A of the cold storage 2. That is, since the compressed air having low temperature is supplied into the cooling cylinder 8 from the air circuit 51, volume does not become bulky, and the constitution is advantageous for the overrun.

Moreover, the air pressure in the sealed space between the outer layer member 23 and the bag main body 21 of the mixed raw material bag 5 is sealed using the air pump 27 and the sensor 47 in the air circuit in this manner, accordingly the volume of the sealed space between them is enlarge to push out the mixture contained in the bag main body 21 into the mixed raw material tube 34, and therefore it is possible to realize automatic supply of the mixture to the cooling cylinder 8 from the bag main body 21. Accordingly, a system in which the mixture is supplied depending on gravity using the mixture supply pipe as in a conventional art is abolished, and stable automatic supply of the mixture can be realized. Moreover, since the mixture is supplied directly to the cooling cylinder 8 from the mixed raw material bag 5, hygienic problems can be solved.

Furthermore, the air pressure in the sealed space between the outer layer member 23 and the bag main body 21 of the mixed raw material bag 5 is maintained at a predetermined pressure between the set value and the lower limit value using the air pump 27 and the sensor 47 in the air circuit in this manner. The mixture is pushed out to the mixed raw material tube 34 from the bag main body 21 by the air pressure, and supplied to the cooling cylinder 8. Moreover, the air circuit open/close electromagnetic valve 52 is opened to let in the compressed air from the air circuit 51, and accordingly the replenishment of the mixture from the mixed raw material tube 34 is stopped. Therefore, an electromagnetic valve for controlling the supply of the mixture on the side of the mixed raw material tube 34 does not have to be disposed. Accordingly, a cleaning operation is remarkably facilitated.

(4) Sold-Out Time

When the above-described selling operation is performed, and the mixture in the bag main body 21 of the mixed raw material bag 5 is eliminated, the mixture to be replenished is eliminated even by the extraction of the frozen dessert performed after the detection of the selling. Therefore, a change of the pressure detected by the sensor 47 in the air circuit is not generated or remarkably reduced. In the embodiment, when there is not any pressure change after the selling detection, the microcomputer 73 judges that all has been sold, and continuously turns on the sold-out display lamp 78 (ON). The operation of the air pump 27 also stops.

(5) Bag Change

When the user confirms that the mixture has been sold out by the lit sold-out display lamp 78, and opens the heat-insulating door 3 for replacement, the microcomputer 73 opens the air circuit exhaust electromagnetic valve 48 for five seconds to discharge the compressed air in the same manner as described above. Thereafter, the bag pressurizing pipe 7 and the mixed raw material tube 34 are removed, and the emptied mixed raw material bag 5 is taken out. In this case, the mixed raw material tube 34, the attachment nuts 66, 62, the connection pipe 63, and the O ring 64 are cleaned. Moreover, a new mixed raw material bag 5 is set in the storage inside 2A. After connecting the bag pressurizing pipe 7 and the mixed raw material tube 34, the heat-insulating door 3 is closed. Then, the microcomputer 73 operates the air pump 27 again to raise the air pressure detected by the sensor 47 in the air circuit to the set value, and a selling standby state is obtained.

Here, when there remains the mixture in the mixed raw material bag 5 at a shop closing time, the mixture is kept to be cold in the storage inside 2A of the cold storage 2, and used for business the next day. In this case, first the mixed raw material tube 34 which is a flexible tube is held by the pinch 68, and sealed. Accordingly, the mixture does not flow out of the bag main body 21. Thereafter, the attachment nut 66 of the mixed raw material tube 34 is removed, and the mixed raw material tube 34 is removed from the Y-type mixing unit 57. The bag pressurizing pipe 7 is also detached from the communication port member 24.

Figure 7:
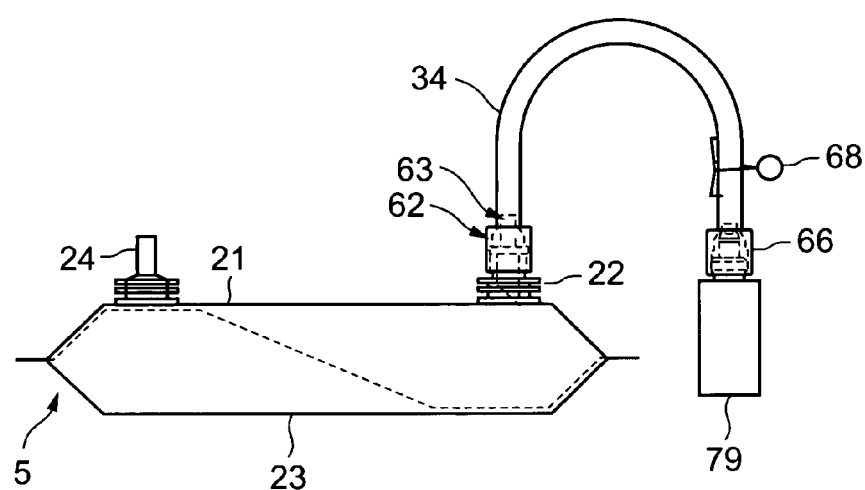
FIG. 7 is a diagram showing a state in which the mixed raw material bag is cold-stored after a shop is closed.

Next, as shown in FIG. 7, a sterile container 79 in which an alcohol liquid or the like is stored, and the tip of the mixed raw material tube 34 is disconnectably connected to the port of the sterile container 79 by the attachment nut 66, and stored to be cold in the storage inside 2A of the cold storage 2. Accordingly, the mixed raw material bag 5 can be stored in the storage inside 2A of the cold storage 2 in a hygienic state.

It is to be noted that instead of using the sterile container 79, a method may be used in which the mixed raw material tube 34 is sealed by the pinch 68, thereafter the attachment nut 66 is removed, and the tip of the tube 34 is sterilized with alcohol for storage in the storage inside 2A.

Moreover, the cooling cylinder 8 or each part of the mixture supply path needs to be cleaned at the shop closing time. In this case, the power plug is first removed to stop the operation. Next, as described above, the mixed raw material tube 34 which is a flexible tube is held by the pinch and sealed. Moreover, after detaching the attachment nut 66 of the mixed raw material tube 34 connected to the mixed raw material bag 5 from the connection pipe 67 of the Y-type mixing unit 57, the Y-type mixing unit 57 is also removed from the mixture inlet 9. Moreover, the connection pipes 67, 69, the check valves 54, 56, and the O ring 71 are detached from the Y-type mixing unit 57 and disassembled, and the Y-type mixing unit 57, connection pipes 67, 69, check valves 54, 56, and O ring 71 are cleaned.

On the other hand, the connector 43 on the tip of the cleaning hose 39 disposed in the storage inside 2A is connected to the mixture inlet 9 during the cleaning in the cooling cylinder 8. Moreover, when the open/close plug 42 is opened, cleaning water is supplied into the cooling cylinder 8 from the cleaning hose 39. The beater 10 is rotated, and the remaining frozen dessert attached to the cooling cylinder 8 is washed with cooling water in a state in which the supplied cleaning water is stored. The plunger 16 is opened to thereby discharge the cleaning water to the outside from the cooling cylinder 8.

In this case, the connector 43 on the tip of the cleaning hose 39 constantly closes the tip opening of the hose. Therefore, even when the open/close plug 42 is operated by mistake in a state in which the connector is not connected to the mixture inlet 9, the cleaning water does not leak into the storage inside 2A. Moreover, after ending the cleaning in the cooling cylinder 8, the connector 43 is detached from the mixture inlet 9, and connected to the cleaned Y-type mixing unit 57 or the like to prepare for the business the next day.

Figure 8:
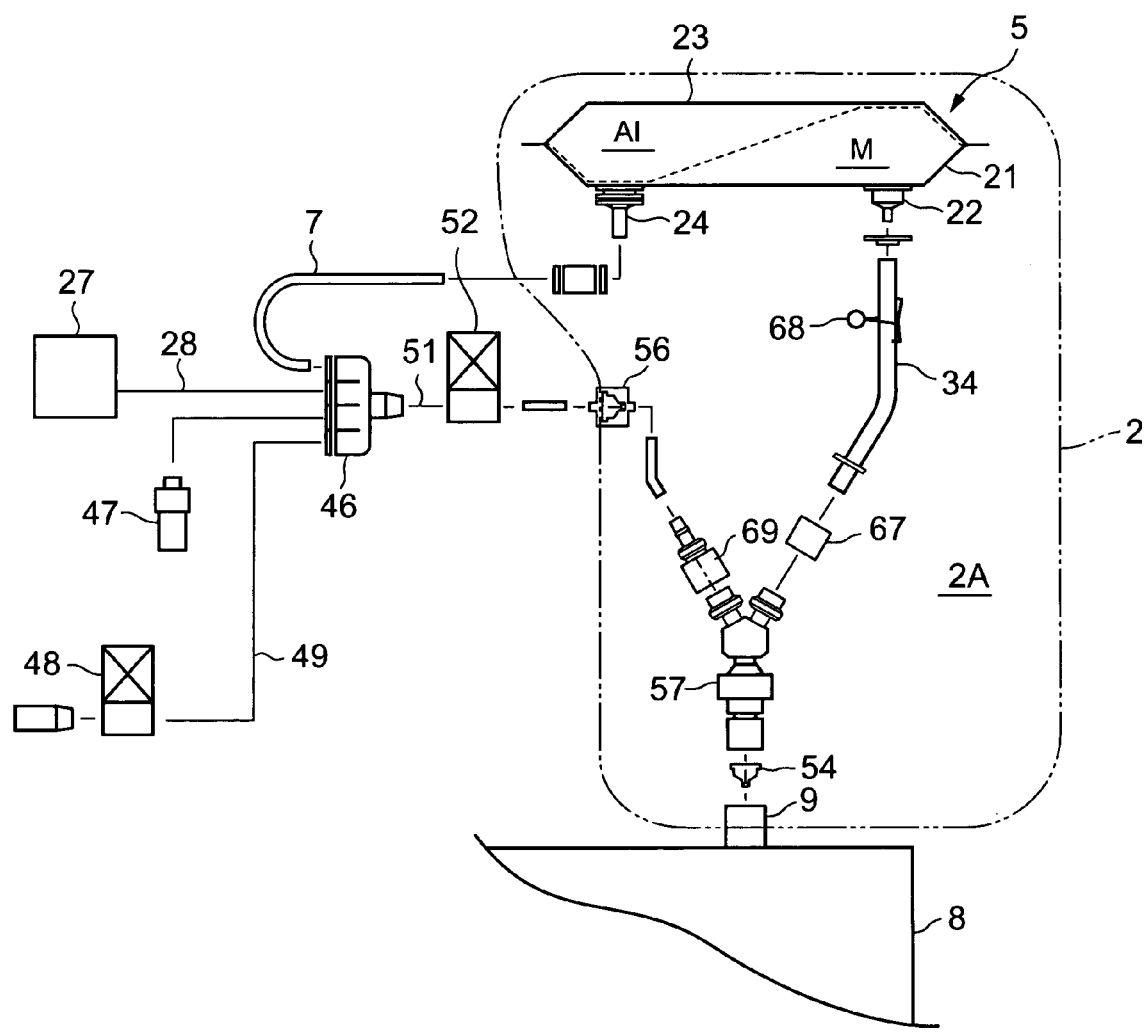
FIG. 8 is a constitution diagram concerning the mixture supplying in the frozen dessert manufacturing apparatus according to another embodiment of the present invention.

It is to be noted that in the above-described embodiment, the check valve 54 is disposed between the mixed raw material tube 34 and the Y-type mixing unit 57, and the check valve 56 is disposed between the air circuit 51 and the Y-type mixing unit 57. However, the present invention is not limited to this embodiment. As shown in FIG. 8, the check valve 54 is connected between the Y-type mixing unit 57 and the mixture inlet 9 of the cooling cylinder 8, and the check valve 56 may be connected to a position where the air circuit 51 extends out of the storage inside 2A of the cold storage 2. It is to be noted that the side of the cooling cylinder 8 of either of the check valves 54 and 56 is set to a forward direction.

Even in this case, since the check valve 54 is in a path where the mixture supplied to the cooling cylinder 8 from the mixed raw material bag 5 flows in the same manner as described above, the mixture in the cooling cylinder 8 does not flow backwards toward the mixed raw material tube 34 or the air circuit 51. Since the check valve 56 is in the air circuit 51 constituting a path where the compressed air supplied to the cooling cylinder 8 from the air pump 27 flows, the disadvantage that the mixture flows backwards to the air circuit 51 outside the storage inside 2A is prevented, and necessity for cleaning can be avoided.

Figure 9:
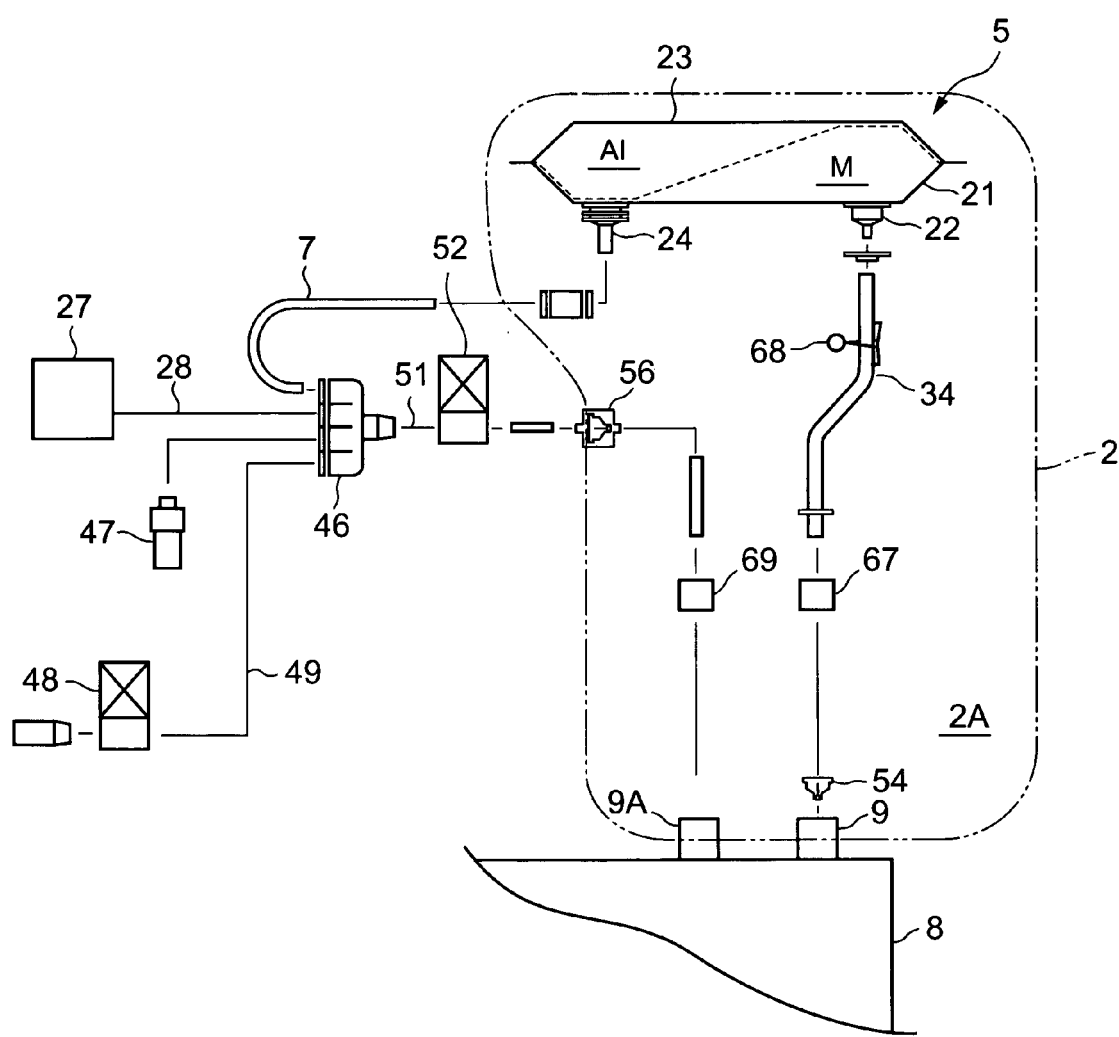
FIG. 9 is a constitution diagram concerning the mixture supply of the frozen dessert manufacturing apparatus according to still another embodiment of the present invention.

Moreover, in the above-described respective embodiments, after the mixture is combined with the compressed air by the Y-type mixing unit 57, they are supplied to the cooling cylinder 8. However, the present invention is not limited to the embodiments. As shown in FIG. 9, a compressed air inlet 9A is separately formed in the cooling cylinder 8, the compressed air inlet 9A is connected to the air circuit 51, and the compressed air may be supplied to the cooling cylinder 8 separately from the mixture.

Furthermore, in the above-described embodiment, refrigerant is circulated in the respective cooling units 4, 11 in the same cooling device R, and the storage inside 2A of the cold storage 2 and the cooling cylinder 8 are cooled. However, as to the cold storage cooling unit 4, a special compressor or condenser is disposed to constitute a separate cooling device, the refrigerant is circulated, and the storage inside 2A may be cooled.

As described above, a liquid containing bag of the present invention comprises: a bag main body containing a liquid and having flexibility; and an outer layer member disposed outside the bag main body, capable of forming a sealed space between the member and the bag main body, and having the flexibility. Therefore, for example, when the compressed air is sealed between the outer layer member and the bag main body, the volume of the sealed space between them is enlarged, and the liquid contained in the bag main body can be pushed out to the outside. Accordingly, it is possible to realize automatic supply of the liquid from the bag main body.

Especially, according to the present invention, the bag additionally comprises: an outlet member connecting the inside of the bag main body to the outside; and a communication port member connecting the space between the outer layer member and the bag main body to the outside. Therefore, the above-described supplying of the compressed air and the connecting of the pipe or the like for outflow of the liquid are also remarkably facilitated.

Moreover, the frozen dessert manufacturing apparatus of the present invention comprises: a cold storage which cold-stores the liquid containing bag containing the mixture in the bag main body; a cooling cylinder which stirs and cools the mixture flowing out of the bag main body of the liquid containing bag to thereby manufacture frozen dessert; a cooling device which cools the cold storage or the cooling cylinder; and an air compression device which supplies compressed air between the outer layer member and the bag main body of the liquid containing bag and which pushes out the mixture in the bag main body. Therefore, the mixture is stored to be cold together with the liquid containing bag. By the air compression device, the compressed air is supplied between the outer layer member and the bag main body of the liquid containing bag to forcibly push out the mixture from the bag main body, and the mixture can be supplied directly to the cooling cylinder to manufacture the frozen dessert.

Accordingly, a system in which the mixture is supplied depending on gravity is abolished, and stable automatic supply of the mixture can be realized. Moreover, since the mixture is supplied directly to the cooling cylinder from the mixed raw material bag, hygienic problems can be solved.

Moreover, a frozen dessert manufacturing apparatus of the present invention comprises: a cold storage which cold-stores a mixed raw material bag constituted of a bag main body containing a mixture and having flexibility and an outer layer member disposed outside the bag main body, capable of forming a sealed space between the member and the bag main body, and having flexibility; a cooling cylinder which stirs and cools the mixture supplied from the mixed raw material bag to thereby manufacture frozen dessert; a cooling device which cools the cold storage or the cooling cylinder; an air compression device; a mixture supply passage for connecting the inside of the bag main body of the mixed raw material bag to the inside of the cooling cylinder; a bag pressurizing passage for supplying compressed air produced by the air compression device between the outer layer member and the bag main body of the mixed raw material bag; and an air supply passage for supplying the compressed air into the cooling cylinder. Therefore, the mixture is stored to be cold together with the mixed raw material bag in the cold storage. By the air compression device, the compressed air is supplied between the outer layer member and the bag main body of the mixed raw material bag via the bag pressurizing passage to forcibly push out the mixture from the bag main body, and the mixture can be supplied directly to the cooling cylinder via the mixture supply passage to manufacture the frozen dessert.

Accordingly, a system in which the mixture is supplied depending on gravity is abolished, and stable automatic supply of the mixture can be realized. Moreover, since the mixture is supplied directly to the cooling cylinder from the mixed raw material bag, hygienic problems can be solved. Furthermore, since the compressed air is supplied into the cooling cylinder via the air supply passage, overrun of the frozen dessert can be obtained without any problem.

Moreover, according to the present invention, the frozen dessert manufacturing apparatus additionally comprises: a check valve which is in a forward direction on the side of the cooling cylinder in a path in which the mixture supplied to the cooling cylinder from the liquid containing bag flows and in a path in which the compressed air supplied to the cooling cylinder from the air compression device flows. Therefore, a disadvantage that the mixture flows backwards in the path where the compressed air flows can be prevented. Accordingly, a danger of clogging is avoided, and a cleaning operation can be saved.

Moreover, a frozen dessert manufacturing apparatus of the present invention comprises: a cold storage which cold-stores a mixed raw material bag constituted of a bag main body containing a mixture and having flexibility and an outer layer member disposed outside this bag main body, capable of forming a sealed space between the outer layer member and the bag main body, and having flexibility; a cooling cylinder which stirs and cools the mixture supplied from the mixed raw material bag to thereby manufacture frozen dessert; a cooling device which cools the cold storage or the cooling cylinder; an air compression device; a mixture supply passage for connecting the inside of the mixed raw material bag to the inside of the cooling cylinder; a bag pressurizing passage for supplying compressed air produced by the air compression device between the outer layer member and the bag main body of the mixed raw material bag; and an air supply passage for supplying compressed air into the cooling cylinder. The mixture supply passage is combined with the air supply passage, and thereafter connected to the inside of the cooling cylinder. Therefore, the mixture is stored to be cold together with the mixed raw material bag in the cold storage. By the air compression device, the compressed air is supplied between the outer layer member and the bag main body of the mixed raw material bag via the bag pressurizing passage to forcibly push out the mixture from the bag main body, and the mixture can be supplied directly to the cooling cylinder via the mixture supply passage to manufacture the frozen dessert.

Accordingly, a system in which the mixture is supplied depending on gravity is abolished, and stable automatic supply of the mixture can be realized. Moreover, since the mixture is supplied directly to the cooling cylinder from the mixed raw material bag, hygienic problems can be solved. Furthermore, since the compressed air is supplied into the cooling cylinder via the air supply passage, overrun of the frozen dessert can be obtained without any problem. Especially, after combining the mixture supply passage with the air supply passage, the passages are allowed to communicate with the inside of the cooling cylinder. Therefore, both the supplying of the mixture into the cooling cylinder and the supplying of the air for the overrun can be performed from one position, and a structure of the cooling cylinder is simplified.

Moreover, the frozen dessert manufacturing apparatus of the present invention additionally comprises: a combined passage member detachably attached to the cooling cylinder and disconnectably connected to the mixture supply passage and the air supply passage. Therefore, a cleaning operation of the mixture supply passage or the combined passage member is facilitated.

Furthermore, the frozen dessert manufacturing apparatus of the present invention additionally comprises: check valves which are connected between the mixture supply passage and the combined passage member and between the air supply passage and the combined passage member and which are in a forward direction on the side of the combined passage member. Therefore, a disadvantage that the mixture flows into the air supply passage from the mixture supply passage or compressed air flows into the mixture supply passage from the air supply passage can be avoided. Disadvantages caused by contamination/damage by the mixture of the air supply passage and the backward flow of the air into the bag main body from the mixed raw material bag can be avoided in advance.

Additionally, according to the frozen dessert manufacturing apparatus of the present invention, the combined passage member is disposed in the cold storage. Therefore, the temperature of the mixture or the compressed air flowing into the cooling cylinder via the combined passage member can be prevented from being raised in the course of the passing.

Moreover, in addition to the above-described respective inventions, accordingly to the frozen dessert manufacturing apparatus of the present invention, the temperature of the mixture flowing into the cooling cylinder via the mixture supply passage can be prevented from being raised in the course of the passing.

What is claimed is:

1. A frozen dessert manufacturing apparatus comprising: a cold storage which cold-stores a liquid containing bag constituted of a bag main body containing a mixture and having flexibility and an outer layer member disposed outside this bag main body, capable of forming a sealed space between the outer layer member and the bag main body, and having flexibility; a cooling cylinder which stirs and cools the mixture supplied from the liquid containing bag to thereby manufacture frozen dessert; a cooling device which cools the cold storage or the cooling cylinder; an air compression device; a mixture supply passage for connecting the inside of the bag main body of the liquid containing bag to the inside of the cooling cylinder; a bag pressurizing passage for supplying compressed air produced by the air compression device between the outer layer member and the bag main body of the liquid containing bag; an air supply passage for supplying compressed air into the cooling cylinder; and a combined passage member detachably attached to the cooling cylinder and disconnectably connected to the mixture supply passage and the air supply passage, wherein the mixture supply passage is combined with the air supply passage, and thereafter connected to the inside of the cooling cylinder by the combined passage member, and the combined passage member is disposed in the cold storage.

2. The frozen dessert manufacturing apparatus according to claim 1, further comprising: check valves which are connected between the mixture supply passage and the combined passage member and between the air supply passage and the combined passage member and which are in a forward direction on the side of the combined passage member.

3. The frozen dessert manufacturing apparatus according to claim 1 or 2, wherein the mixture supply passage is disposed in the cold storage.

* * * * *